United States Patent [19]

Ruetman et al.

[11] Patent Number: 4,895,894

[45] Date of Patent: Jan. 23, 1990

[54] MODULUS MODIFICATION OF WATER BORNE POLYURETHANE-UREAS

[75] Inventors: Sven H. Ruetman, Walnut Creek; Joginder N. Anand, Clayton, both of Calif.

[73] Assignee: The Dow Chemical Company, Midland, Mich.

[21] Appl. No.: 200,287

[22] Filed: May 31, 1988

[51] Int. Cl.$^4$ .................... C08L 75/12; C08L 75/08
[52] U.S. Cl. .................................................. 524/840
[58] Field of Search ........................................ 524/840

[56] References Cited

U.S. PATENT DOCUMENTS

| | | | |
|---|---|---|---|
| 3,870,684 | 3/1975 | Witt et al. | 260/75 NH |
| 4,066,591 | 1/1978 | Scriven | 524/840 |
| 4,108,814 | 8/1978 | Reiff et al. | 260/29.2 TN |
| 4,203,883 | 5/1980 | Hangauer | 260/29.2 TN |
| 4,408,008 | 10/1983 | Markusch | 524/591 |
| 4,501,852 | 2/1985 | Markusch et al. | 524/591 |
| 4,644,030 | 2/1987 | Loewrigkeit | 524/840 |

Primary Examiner—C. Warren Ivy

[57] ABSTRACT

Disclosed are novel stable aqueous dispersions of ionic polyurethane-polyureas prepared from (A) aqueous dispersions of isocyanate terminated ionic prepolymers and (B) hydrocarbon polyamine extenders. The novelty resides in employing a mixture of a diol and triol in the prepolymer forming step. Also disclosed are the films and coated substrates obtained through the use of said dispersions as coatings.

12 Claims, No Drawings

MODULUS MODIFICATION OF WATER BORNE POLYURETHANE-UREAS

FIELD OF THE INVENTION

This invention relates to water borne ionic polyurethane-polyureas and is more particularly concerned with improved ionic polyurethane-polyureas whose soft segment polyol component comprises high levels of triols along with the conventional diols.

DESCRIPTION OF THE PRIOR ART

Stable aqueous dispersions of polyurethane-polyureas containing chemically incorporated anionic or cationic groups have long been known to be useful in various coating applications. The coatings and sizings prepared from the dispersions have excellent chemical resistance, abrasion resistance, toughness, and the like.

D. Dieterich et al. as early as 1970 published one of the first technical reviews on ionic polyurethane-polyurea aqueous dispersions; see Angewante Chemie Intn'l. Ed 9, pp 40 to 50 (1970). This was followed by a comprehensive review by the same author in Progress In Organic Coatings 9 (1981), pp 218 to 340. For the most part, the polymers are prepared from components which are essentially difunctional in both isocyanate and isocyanate-reactive ingredients. This means the polymers are essentially linear, and, organic solvent soluble in their final form. However, cross-linked polyurethane-polyurea aqueous dispersions are known as noted below.

U.S. Pat. No. 3,870,684 discloses aqueous dispersions of polyurethane-polyureas wherein the cross-linking is effected by mixing as a solution in an organic solvent an isocyanate terminated prepolymer having ionic groups with an aqueous solution of an aliphatic polyamine containing a total of at least three primary and/or secondary amine groups of which at least two are primary. These compositions, also known as latexes, have the advantage of being able to form cross-linked polymers as aqueous dispersions while avoiding the prior art problems of the formation of lumps and curds. However, the method of preparation requires organic solvents and the need for highly functional polyamines.

U.S. Pat. No. 4,203,883 discloses cross-linked polyurethane-polyureas closely related to those set forth in U.S. Pat. No. 3,870,684 cited supra. The cross-linking is effected by reacting an isocyanate terminated polyurethane prepolymer containing tertiary amine neutralized carboxylic acid groups with a triamine or mixture of triamine with diamine. Again, the employment of organic solvent is favored at least in the preparation of the prepolymer component.

U.S. Pat. No. 4,408,008 also discloses stable aqueous dispersions of cross-linked urea-urethane polymers wherein the cross-linking is achieved through the use of polyfunctional amine chain extenders with average functionalities of 2.2 to 6. The polymers achieve their aqueous dispersability primarily by having monomer ingredients carrying nonionic hydrophilic ethyleneoxy chains in pendant or lateral configuration. The presence of ionic units in the polymer chains is optional but preferred. The teaching of this patent is very clear in calling for substantially linear prepolymers prior to the cross-linking step. This is spelled out in detail when discussing the polyol components to be used in prepolymer preparation. If the ingredients are to contain any trifunctionality, it is limited to small proportions and then only special cases for slight branching of the prepolymer using an extender such as trimethylolpropane. Average functionality of the prepolymer starting components is stipulated to be below 2.1.

U.S. Pat. No. 4,501,852 discloses stable aqueous dispersions of anionic polyurethane-ureas which can be either linear or cross-linked depending on the functionality of the polyamine extender reacted with the prepolymer. Similarly to U.S. Pat. No. 4,408,008 cited supra, the isocyanate prepolymer is difunctional and limited to starting components of average functionality below 2.1. The novelty in this disclosure stems from the fact that a combination of anionic groups and a small proportions of lateral or terminal hydrophilic ethyleneoxy chains are present in the prepolymer with the neutralizing counterions of the anionic groups being a mixture of volatile and non-volatile cations. The latter, in the form of low boiling tertiary amines, are easily evolved from the final aqueous polymer dispersion when films are being formed. The net result is polyurethane-polyurea coating having improved hydrolytic stability.

Generally speaking, the prior art teachings that the prepolymers in the first stage of preparation be essentially difunctional. Furthermore, the preference for the use of organic solvents throughout the preparation of the aqueous dispersions is also taught. In order to avoid the use of solvent, U.S. Pat. No. 4,108,814 specifically calls for the use of alkali metal or ammonium salts of particular sulfonate containing diols.

It still remains in the art to provide aqueous dispersions of ionic polyurethane-polyurea polymers with the more conventional ionic groups without resorting to the use of organic solvents.

Accordingly, it would be highly beneficial if the organic solvent could be eliminated completely, yet still allow the use of all of the conventional ionic reactants. This elimination of solvent would be even more attractive if it lead either directly or indirectly to better physical properties in the final polyurethane-polyurea polymers.

SUMMARY OF THE INVENTION

The present invention is directed to improved stable aqueous dispersions of ionic polyurethane-polyureas prepared by the reaction of (A) an aqueous dispersion of an isocyanate terminated ionic prepolymer with (B) a hydrocarbon polyamine extender said prepolymer having been prepared from (i) an excess of an aliphatic or cycloaliphatic diisocyanate, (ii) an organic diol, and (iii) a difunctional isocyanate-reactive component containing an ionic group or potential ionic group, wherein the improvement consists of said component (ii) comprising a mixture of said diol and an organic triol having a molecular weight of from about 250 to about 6,000.

This invention is also directed to films prepared from the aqueous dispersions of the ionic polyurethane-polyureas set forth above.

The term "hydrocarbon" as used herein with respect to the polyamine extender component means a hydrocarbon residue having from about 2 to about 20 carbon atoms remaining after the replacement of the appropriate number of hydrogen atoms by primary or secondary amine groups; inclusive of said hydrocarbon residue are aliphatic of $C_2$ to $C_{10}$, cycloaliphatic of $C_5$ to $C_{18}$, aromatic of $C_6$ to $C_{20}$, and the like.

The term "aliphatic diisocyanate" means an organic isocyanate containing two aliphatically bound isocyanate groups wherein the aliphatic divalent residue is an alkylene radical having from about 6 to about 12 carbon atoms, inclusive, such as hexamethylene, heptamethylene, octamethylene, nonamethylene, decamethylene, undecamethylene, dodecamethylene, and isomeric forms thereof.

The term "cycloaliphatic diisocyanate" means an organic diisocyanate containing two cycloaliphatically bound isocyanate groups wherein the cycloaliphatic divalent residue contains one or two cycloalkylene radicals each cycloalkylene having from about 5 to about 8 carbon atoms, inclusive, such as cyclopentylene-1,3, 4-methylcyclopentylene-1,3, cyclohexylene-1,3, cyclohexylene-1,4, 2-methylcyclohexylene-1,4, 2,5-dimethylcyclohexylene-1,4, cycloheptylene-1,3, cycloheptylene-1,4, 6-methylcycloheptylene-1,4, cyclooctylene-1,3, cyclooctylene-1,4, cyclooctylene-1,5, and the like; 4,4'-methylenebis(cyclohexylene), 4,4'-isopropylidenebis(cyclohexylene), 4,4'-dicyclohexylene, and the like.

The term "difunctional isocyanate-reactive component" means any organic compound carrying two separate groups each capable of reacting with an isocyanate group because of active hydrogens according to the Zerewitinoff test, such as —OH, —NH$_2$, —SH, —COOH, and the like.

The term "ionic group or potential ionic group" means a group either already in an anionic or cationic form or else, by neutralization with a reagent, readily converted to said anionic or cationic form respectively. Illustrative of such potential anionic groups (and neutralized form) are —COOH(—COO$\ominus$), —SO$_2$OH(—SO$_2$O$\ominus$), and =POOH(=POO$\ominus$); illustrative of such potential cationic groups (and neutralized form) are $\equiv$N($\equiv$N—$\oplus$), $\equiv$P($\equiv$P—$\oplus$), and =S(=S—$\oplus$).

Quite unexpectedly, it has been discovered that the replacement of a considerable proportion of the organic diol by an organic triol in the isocyanate terminated prepolymer preparation results, not only in the elimination of organic solvent both in prepolymer and final polymer formation, but also to excellent aqueous dispersion stability of the final ionic polyurethane-polyureas themselves.

Additionally, and even more unexpected, is the discovery that permanent set properties of the films prepared from the dispersions remain relatively constant in spite of the films' increase in Shore A hardness and modulus properties.

The ionic aqueous dispersions of this invention, by virtue of their good film-forming properties are useful in a wide variety of coating applications. The fact that the coatings are transparent and have good tensile properties broadens the applications in which they can be employed. Typically they can be used as sizing in the manufacture of high grade paper, coatings and impregnants for textiles, leather, fibers, and the like. However, the toughness and clarity of the films make them particularly useful as protective coating for other plastic articles made from such materials as polycarbonates, acrylics, and the like. Window glazing, security glass and aircraft canopies are but a few of the uses to which the present films can be applied.

DETAILED DESCRIPTION OF THE INVENTION

The preparation of the aqueous dispersions of the ionic polyurethane-polyureas is carried out using any of the conventional methods and ingredients known to those skilled in the art except for the novel use of the triol components which will be discussed in detail below. Typical preparative methods are disclosed in the U.S. Pat. Nos. 3,870,684, 4,108,814; 4,203,883; 4,408,008; and 4,501,852 cited supra whose disclosures relative thereto are incorporated herein by reference. Generally speaking, the aqueous dispersions are preferably prepared by a two-stage process wherein an isocyanate-terminated prepolymer (A) is made in the first stage followed by chain-extending or finalizing the polymer formation in the second stage with a hydrocarbon polyamine (B) defined above. The aqueous portion of the dispersion can be introduced before or during the reaction of (B) with (A). In respect of the ionic portions of the polyurethane-polyureas these are preferably incorporated as part of the first stage prepolymer and will be discussed in detail below.

The term "dispersion" as used herein means a two-phase system comprising the ionic polyurethane-polyurea as the dispersed phase in the continuous aqueous phase. It is to be understood that the dispersed phase can be a liquid or a solid. Accordingly, the present products comprehend both emulsions and suspensions.

The diisocyanates (i) which can be employed for the isocyanate terminated prepolymer (A) preparation are defined above. Illustrative but non-limiting of the diisocyanates are 1,6-hexamethylene diisocyanate, 1,7-heptamethylene diisocyanate, 1,8-octamethylene diisocyanate, 1,9-nonamethylene diisocyanate, 1,10-decamethylene diisocyanate, 1,11-undecamethylene diisocyanate, 1,12-dodecamethylene diisocyanate, 2,2,4-trimethylhexamethylene diisocyanate, 2,4,4-trimethylhexamethylene diisocyanate, and the (3-isocyanatopropoxy)-(3-isocyanatopropyl)arylenes such as 1-(3-isocyanatopropoxy)-4-(3-isocyanatopropyl)benzene described in U.S. Pat. No. 4,051,166, 1,4-bis(2-isocyanatoethyl)cyclohexane, and the like; isophorone diisocyanate otherwise identified as 1-isocyanato-3-isocyanatomethyl-3,5,5-trimethylcyclohexane; and cycloaliphatic diisocyanates such as methylenebis(cyclohexyl isocyanate) including the 4,4'-isomer, the 2,4'-isomer, and mixtures thereof, and all the geometric isomers thereof including trans/trans, cis/trans, cis/cis and mixtures thereof, cyclohexylene diisocyanates (1,2-; 1,3-; or 1,4-), 1-methyl-2,5-cyclohexylene diisocyanate, 1-methyl-2,4-cyclohexylene diisocyanate, 1-methyl-2,6-cyclohexylene diisocyanate, 4,4'-isopropylidenebis(cyclohexyl isocyanate), 4,4'-diisocyanatodicyclohexyl, 1,4-diisocyanatocycloheptylene, 1,4-diisocyanatocyclooctylene, and the like.

Preferred as a group are the cycloaliphatic diisocyanates and preferred within this group are the methylenebis(cyclohexyl isocyanates) with the 4,4'-isomer being particularly preferred.

The organic diols (ii) can be any of the high molecular weight diols exemplified in the incorporated references above. Preferably, the molecular weight falls in the range of from about 500 to about 6,000, more preferably, from about 1,000 to about 3,000. The term "molecular weight" as used herein means the number average molecular weight as determined by end-group analysis or other colligative property measurement.

Exemplary of the diols which can be employed are: polyether diols, polyester diols, hydroxy-terminated polycarbonates, hydroxy-terminated polybutadienes, hydroxy-terminated polybutadiene-acrylonitrile copolymers, hydroxy-terminated copolymers of dialkyl siloxane and alkylene oxides such as ethylene oxide, propylene oxide and the like, and mixtures in which any of the above polyols are employed as major component (greater than 50% w/w) with difunctional amine-terminated polyethers and amino-terminated polybutadiene-acrylonitrile copolymers.

Illustrative of polyether diols are polyoxyethylene glycols, polyoxypropylene glycols, polyoxybutylene glycols which, optionally, have been capped with ethylene oxide residues, random and block copolymers of ethylene oxide, propylene oxide, and butylene oxide, random and block polymers of tetrahydrofuran and ethylene oxide and or propylene oxide, and products derived from any of the above by reaction with difunctional carboxylic acids or esters derived from said acids in which latter case ester interchange occurs and the esterifying radicals are replaced by polyether polyol radicals. The preferred polyether polyols are random and block copolymers of ethylene and propylene oxide of functionality approximately 2.0 and polytetramethylene glycol polymers.

Illustrative of polyester diols are those prepared by polymerizing ε-caprolactone using an initiator such as ethylene glycol, ethanolamine and the like, and those prepared by esterification of polycarboxylic acids such as phthalic, terephthalic, succinic, glutaric, adipic, azelaic and the like acids with dihydric alcohols such as ethylene glycol, butanediol, cyclohexanedimethanol and the like.

Illustrative of the amine-terminated polyethers are the aliphatic primary diamines structurally derived from polyoxypropylene glycols. Polyether diamines of this type are available from Texaco under the trademark JEFFAMINE.

Illustrative of polycarbonates containing hydroxyl groups are those prepared by reaction of diols such as propane-1,3-diol, butane-1,4-diol, hexan-1,6-diol, 1,9-nonanediol, 2-methyloctane-1,8-diol, diethylene glycol, triethylene glycol, dipropylene glycol and the like with diarylcarbonates such as diphenylcarbonate or with phosgene.

Illustrative of the silicon-containing polyethers are the copolymers of alkylene oxides with dialkylsiloxanes such as dimethylsiloxane and the like; see, for example, U.S. Pat. No. 4,057,595.

Illustrative of the dihydroxy-terminated polybutadiene copolymers are the compounds available under the trade name Poly BD Liquid Resins from Arco Chemical Company. Illustrative of the dihydroxy- and diamine-terminated butadiene/acrylonitrile copolymers are the materials available under the trade name HYCAR hydroxyl-terminated (HT) Liquid Polymers and amine-terminated (AT) Liquid Polymers, respectively.

The most preferred diols comprise the preferred random and block polyether diols and polytetramethylene glycols set forth above otherwise referred to as polyalkyleneoxy diols and with polyethyleneoxy-capped polypropyleneoxy diols being most specifically preferred.

The novelty in the present invention resides in the replacement of a portion of the above diol component with an organic triol having a molecular weight of from about 250 to about 6,000, preferably from about 500 to about 3,000, and most preferably from about 500 to about 2,000. Accordingly, the component (ii) for preparing said isocyanate terminated ionic prepolymer comprises a mixture of at least one diol with at least one triol The proportions in which the triol is to be employed with vary somewhat according to its molecular weight. Branching and eventual cross-linking of the final polymer will be controlled largely by the molecular weight factor. As molecular weight of the triol decreases, then branching in the prepolymer leading to possible cross-linking therein, and, most assuredly, in the final polyurethane polyurea will occur. Accordingly, the ultimate film properties desired will dictate triol molecular weight and the proportions in which to use it. Advantageously, the triol can be present in the mixture in up to about 50 hydroxyl equivalent percent. That is to say, of the total hydroxyl equivalents employed in the prepolymer preparation, up to about 50 percent can be contributed by the triol component. Above the 50 percent level will generally lead to visible gel formations in the aqueous dispersions. Preferably, the polyol mixture (ii) comprises from about 5 to about 50 equivalent percent of said triol and from 95 to 50 percent of said diol. More preferably, the triol falls in a range of from about 10 to about 40 percent with diol being 90 to 60 percent.

The triol can be any of the organic polyols known in the urethane art to be trihydric in functionality and which fall into the molecular weight ranges set forth above. The triols can be identically obtained to those diols described above except for the use of initiators and starting materials leading to trihydroxy functionality. For example, polyether triols are readily available or easily prepared in the form of polyoxyethylene triols, polyoxypropylene triols, polyoxybutylene triols, the latter two optionally capped with ethyleneoxy residues, including random and block copolymers. All of these polyether triols are generically identified as polyalkyleneoxy triols are are prepared by the reaction of the corresponding ethylene, propylene, butylene oxides with trifunctional initiators such as glycerine, trimethylolpropane, and the like; optionally, the triols can be prepared from tetrahydrofuran and a trifunctional starter to yield the corresponding polytetramethyleneoxy triols; polyester triols while more difficult to synthesize with the overall trifunctionality than the polyalkyleneoxy triols above, are nevertheless still useful as triol components; typical trifunctional polyester triols are those prepared from ε-caprolactone with an initiator such as glycerine, trimethylolpropane and the like; further illustrative examples of triols include polycarbonate triols prepared by reaction of triols such as trimethylolpropane or glycerine with diphenylcarbonate or phosgene; and mixtures of any of the above triols as the major component (greater than 50% w/w) with trifunctional amine-terminated polyethers.

A preferred class of triols comprises the polyalkyleneoxy triols, particularly those having a molecular weight of from about 500 to about 3,000. Even more preferred are the polyethyleneoxy-capped polypropyleneoxy triols having a molecular weight from about 500 to about 2,000.

Known difunctional chain extenders such as the aliphatic $C_2$ to $C_{10}$ glycols as typically exemplified by ethylene glycol, 1,4-butanediol, 1,6-hexanediol, and the like are not specifically excluded from the present polymers. At the same time, their use is not particularly necessary in the prepolymer (A) preparation unless particularly high hardness is desired in the final films.

The difunctional isocyanate-reactive components (iii) are necessary to provide for the water dispersibility of both the prepolymer and final polyurethane-polyurea as discussed typically in U.S. Pat. No. 3,479,310. Such components contain an ionic group or potential ionic group as defined above and include any of those compounds disclosed in U.S. Pat. No. 4,408,008, particularly column 6, line 63 through column 7, line 57 whose disclosure with respect to these compounds is incorporated herein by reference. Additionally, the U.S. patent disclosures recited in this referenced disclosure including 3,479,310; 3,419,533; 3,412,054; and 4,108,814 are also incorporated herein by reference with respect to the difunctional isocyanate-reactive ionic or potential ionic compounds disclosed.

As noted and defined above, the ionic definition includes both ionic and cationic character. Additionally, the term "neutralize" as used herein for converting potential ionic to ionic groups refers not only to neutralization using true acids and bases but also includes quaternarization, and ternarization. The potential anionic groups typically include carboxylic acid groups, sulfonic acid groups, and phosphoric acid groups which when incorporated into the difunctional isocyanate-reactive component (iii) can be neutralized before, during, or after the prepolymer formation to form the corresponding carboxylate anion, sulfonate anion, and phosphate anion by treatment with such inorganic or organic bases as sodium hydroxide, potassium hydroxide, potassium carbonate, ammonia, tertiary amines such as triethylamine, tripropylamine, tributylamine, and the like. In respect of the potential cationic groups, these typically include tertiary amine, phosphine, and sulfide groups which when incorporated into the difunctional isocyanate-reactive component (iii) can be quaternated or ternated as the case may be by neutralization or quaternarization of the tertiary amine, or reacting the phosphine or sulfide with compounds capable of alkylating the phosphine or sulfide groups. Sometimes it is more convenient to have the precursor phosphine or sulfide groups as a separate reagent with the actual quaternizing or ternarizing moiety in the difunctional component (iii).

The isocyanate-reactive groups themselves as defined above are those having active hydrogen atoms and include hydroxyl, amino, thiol, and carboxylic acid. Preferred of the functional groups are the dihydroxy and diamino compounds with dihydroxy functionality most preferred.

Illustrative but non-limiting of the compounds containing a potential anionic (ionic) group are tartaric acid (mono-, or di-sodium salt), 2,6-dihydroxy benzoic acid (sodium salt, potassium salt, triethylammonium salt), 2,8-dihydroxynaphthoic acid-3 (sodium salt, potassium salt, triethylammonium salt), 3,4-diaminobenzoic acid (sodium salt, potassium salt, triethylammonium salt), 1,7-dihydroxynaphthalenesulfonic acid-3 (sodium salt, potassium salt, triethylammonium salt), 1,8-dihydroxynaphthalenedisulfonic acid-2,4 (sodium salt, potassium salt, triethylammonium salt), 2,4-diaminotoluenesulfonic acid-5 (sodium salt, potassium salt, triethylammonium salt), the sulfonate diols described in U.S. Pat. No. 4,108,814 already incorporated herein, bis($\beta$-hydroxyethyl)phosphinic acid (sodium salt, potassium salt, triethylammonium salt), and the like; illustrative of the compounds containing a potential cationic (ionic) group are methyldiethanolamine (hydrochloride salt, acetic acid salt), N,N-di(2-hydroxypropyl)aniline (hydrochloride salt, acetic acid salt), N-cyclohexyl-N-(3-aminopropyl)propanol-2-amine (hydrochloride salt, acetic acid salt), ethyldiethanolamine (hydrochloride salt, acetic acid salt), glycerol-$\alpha$-bromohydrin quaternated with tributylamine (ammonium salt), or triethyl phosphine (phosphonium salt), glycerol-$\alpha$-bromohydrin ternated with dimethyl sulfide (sulfonium salt), and the like.

Preferred for the component (iii) is a class of dihydroxy alkanoic acids described in U.S. Pat. No. 3,412,054 already incorporated herein. When they are neutralized with any of the inorganic or organic bases discussed in the incorporated references and also above, they result in the preferred anionic moieties. Accordingly, the preferred component (iii) is a carboxylic acid containing diol which can be neutralized with an inorganic or organic base to form said ionic group before, during or after said prepolymer formation. The most preferred dihydroxy alkanoic acids are the $\alpha$, $\alpha$-dimethylol alkanoic acids having the formula QC(CH$_2$OH)$_2$COOH wherein Q is hydrogen or C$_1$ to C$_8$ alkyl (preferred are those acids with C$_1$ to C$_4$). Preferred as the neutralizing agents are the aliphatic C$_2$ to C$_4$ tertiary amines inclusive of triethylamine, tripropylamine, tributylamine, triisopropylamine, and the like, and aqueous or anhydrous ammonia. A most preferred embodiment of the present invention is when the carboxylic acid groups is neutralized with the amine after said prepolymer formation and prior to forming an aqueous dispersion thereof.

The proportions in which component (iii) is to be employed is not particularly critical except to the extent that it be sufficient to result in good dispersion of the prepolymer and final polyurethane-polyurea in water. Advantageously, the component is employed within a range of proportions such that the milliequivalents of ionic groups per 100 grams of prepolymer (A) falls within a range of from about 10 to about 150, preferably about 20 to 100, most preferably about 25 to 75. The equivalent weight of the ionic component is the precursor molecular weight divided by the number of ionic groups. Accordingly, the proportion of (iii) employed divided by its equivalent weight and multiplied by 1,000 provides the ultimate milliequivalents of potential and/or ionic groups present in the total prepolymer weight.

The isocyanate terminated prepolymer (A) as noted above is readily prepared using the conventional procedures already incorporated herein. The excess diisocyanate (i) along with the polyol mixture (ii) and the difunctional isocyanate-reactive component (iii) are brought together in any convenient manner, preferably under the exclusion of moisture prior to the actual formation of aqueous dispersion. This is best achieved by reacting the components under an inert gas such as nitrogen or argon. In a preferred embodiment the isocyanate reactive components of (ii) and (iii) are first thoroughly blended together followed by the excess diisocyanate.

The exact proportion of excess of isocyanate is chosen so that the final polymer properties desired will be obtained. Advantageously, the proportions of (i), (ii) which includes both diol and triol, and (iii) are such that the ratio of isocyanate equivalents to total isocyanate-reactive equivalents in said prepolymer (A) falls in a range of from about 1.1 to about 3, preferably from about 1.2 to 2.

The reaction temperature during prepolymer formation is normally maintained below about 150° C. Generally speaking, the reactants will be heated to a temperature within the range of about 30° C. to about 125° C., preferably about 50° C. to 125° C. In some cases, reaction exotherm will provide heat thereby contributing to these temperature ranges.

Although the use of conventional urethane forming catalysts is not particularly recommended, neither is their use specifically excluded. Generally speaking, catalysts are unnecessary, and, in some cases, can cause the formation of gels when preparing the aqueous dispersions by causing the excess isocyanate to react with the water. This results in reduced stability for the dispersions.

Solvents may be used during the prepolymer formation but one of the benefits of the present invention is eliminating their use. If, for whatever reason, a solvent is to be employed, then any of those recommended in the incorporated references can be employed.

In respect of the neutralization, quaternarization or ternarization step, whatever the case may be, it is preferred to carry it out after the prepolymer has been formed, and, most preferably, before the aqueous dispersion is prepared. The reason for the latter preference is the more facile formation of the dispersion once the ionic groups are present in the prepolymer. It is the hydrophilicity of the ionic groups which give rise to the good aqueous dispersibility of the prepolymer. Therefore, the neutralizing acid, base, alkylating agent, or whatever as required to convert the potential ionic group to its ionic form is added to the rapidly stirred prepolymer in sufficient amount to react with at least about 75 percent, preferably at least about 90 percent of the potential ionic moieties.

The aqueous dispersions are now easily formed simply by mixing the prepolymer with the water, preferably under conditions of rapid stirring or agitation. The concentration of prepolymer in the aqueous dispersion is governed primarily by whatever is expedient in the handling of increased volumes. However, the prepolymer is advantageously present in a concentration of from about 10 percent to about 50 percent by weight based on prepolymer and water. Preferably, its concentration is from about 25 to about 40 percent. These proportions should not be regarded as critically limiting for depending on prepolymer properties and the types of ionic groups involved, concentrations falling outside these ranges can be observed.

It will be understood by those skilled in the art that aqueous dispersions of isocyanate terminated prepolymers are not stable for long periods. Accordingly, the lapse of time between preparation of the prepolymer dispersion and the final polymer forming step should be kept to a minimum. Notably, the prepolymer dispersions in accordance with the present invention enjoy good stability both in regard to their dispersion properties (no separation or settling of solids or liquids) and their lack of reactivity between the isocyanate groups and the water. Stability of the present dispersions may be observed for periods of up to about two hours. However, to ensure full isocyanate concentration the polymer curing step is preferably initiated within about 15 minutes of formation of the prepolymer dispersion.

Completion of the polyurethane-polyurea formation, otherwise known as chain extension is readily accomplished either by mixing the prepolymer dispersion (A) with the chain extender (B) neat or in the form of a solution in an organic solvent or water. Efficient intermixing of the components is highly desirable when dealing with organic dispersions in water. Accordingly, the mixing should be conducted at high stirring speeds using efficient paddles or stirring blades. If the extender is reasonably water soluble, it is preferably that it be so employed as an aqueous solution. The mode or order of mixing is not critical. Generally speaking, it is convenient to add the chain extender solution to the rapidly stirred prepolymer dispersion. However, the reverse mode of addition can be used if desired. Any sequence of addition using aqueous solutions or additional pure water to adjust final dispersion concentration is possible during the prepolymer extension step. In this regard, the weight percent of dispersed polymer can be in any amount deemed appropriate for any particular situation or ultimate application. Conveniently, it can be present in the same percentage proportions set forth above for the dispersed prepolymer.

This chain extension will, for the most part, occur at ambient room temperatures, i.e. 25° C. to 30° C. In some cases, an exotherm may call for actual cooling. Although, the presence of the aqueous dispersant acts as a heat-sink to modify reaction exotherms. The reaction is generally conducted within a temperature range of from about 5° C. to 90° C., preferably from about 20° C. to 60° C. Mixing is continued until the reaction is judged to be complete. The completion is easily determined using conventional analytical procedures for measuring the disappearance of the extender and/or isocyanate groups such as by infrared measurements, gas phase chromatography, gel permeation chromatography, and the like.

The preferred extenders (B) are defined above as the class of hydrocarbon polyamines. The amine groups can be primary or secondary or a mixture of both in the same molecule. Preferably the amine functionality falls within a range of from about 2 to about 4, including average values within this range arising from mixtures of polyamines. Preferred as a class are the hydrocarbon diamines wherein the amine functions are primary.

Illustrative but non-limiting of the polyamines are ethylenediamine, 1,3-propylenediamine, 1,4-butylenediamine, 1,5-pentylenediamine, 1,6-hexylenediamine, 1,7-heptylenediamine, 1,8-octylenediamine, 1,9-nonylenediamine, 1,10-decylenediamine, 2,2,4-trimethylhexamethylenediamine-1,6, 2,4,4-trimethylhexamethylenediamine-1,6, diethylene triamine, triethylene tetramine, iminobispropylamine, and the like; 1,2-cyclohexylenediamine, 1,3-cyclohexylenediamine, 1,4-cyclohexylenediamine, 4,4'-isopropylidenebis(cyclohexyl amine), 4,4'-diaminodicyclohexyl, methylenebis(cyclohexylamine) including the 4,4'-isomer, the 2,4'-isomer and mixtures thereof including all their geometric isomers, 1-amino-3-aminomethyl-3,5,5-trimethylcyclohexane, and the like; 1,3-phenylenediamine, 1,4-phenylenediamine, 2,4-toluenediamine, 2,6-toluenediamine, 4,4'-methylenebis(phenyl amine), 2,4'-methylenebis(phenyl amine), 4,4'-diaminobenzidine, 3,3'-diaminobenzidine, polyymethylene polyphenylene amines, and the like.

More preferred as a class of extenders are those falling within the alkylene diamines, most particularly the alkylene diamines of $C_2$ to $C_8$ as exemplified above.

The proportion of amine extender (B) employed is governed by the isocyanate content of the prepolymer component. Generally speaking, the proportions of (B) are such that the ratio of isocyanate equivalents in (A) to amine equivalents in (B) falls in a range of from about 1.25 to about 0.90, and, preferably from about 1.10 to 0.95.

The resulting aqueous dispersions of ionic polyurethane-polyureas in accordance with the present invention can vary from milky to nearly clear in their visual appearance. The dispersions or emulsions are sometimes referred to as latexes. They are characterized by excellent stabilities allowing them to be stored for long periods which vary depending on such factors as ionic content (hydrophilicity), storage temperatures, molecular weights in a soft segments, and the like. Generally speaking, the dispersions can be stored for days and transported within this period without showing any signs of separating or gelling.

The physical properties of the final polymers obtained whether in the form of films, coatings, or even stoving lacquers can vary from those of soft elastomers to harder thermoplastics and all the way to hard thermoset types depending on the polymer components and proportions. Using amine extenders of functionality greater than 2 in combination with prepolymers having the highest isocyanate contents results in the harder thermosets due to the high hard segment content of the polymer and cross-linking. This is particularly true when the soft segments in the prepolymer are derived from the lowest molecular weight polyols. The terms "soft and hard segments" refer to the polymer linkages derived from the diisocyanate component with the high molecular weight polyols (ii) and with the extender (iii) respectively. Reversing all of the above conditions leads to the softer materials.

The polymer dispersions can be modified further by the addition of colorants, antioxidants, UV stabilizers, fillers, fire-retardants and the like.

Various kinds of substrates can be coated with films from these aqueous dispersions. After the aqueous dispersions are brushed, sprayed, poured, applied by dip-coating, doctor-knife, or otherwise applied to a substrate such as woven and non-woven textiles, leather, paper, wood, metals, ceramics, fibers, plastics such as polycarbonates, acrylics, polyamides, polyurethanes, polyesters, polystyrenes, acrylonitrile/butadiene/styrene copolymers, polyethylenes, (high, low and ultra-low densities), rubbers including natural and synthetic, and the like, the water is removed by conventional drying methods.

Drying can be carried out either at ambient room temperatures (e.g. 20° C.) or at elevated temperatures, for example, from about 25° C. to about 150° C., optionally under forced-draft or vacuum. This includes the drying of static substrates in ovens such as forced-air and vacuum ovens; or continuously conveying the coated substrates through chambers heated by forced air, high intensity lamps, and the like or under reduced pressures.

In the preparation of free standing films, the techniques particular to this art are readily applied. For example, the aqueous dispersion can be poured into the appropriate mold, or applied by doctor-knife to a metal or glass plate. Thereafter, the water can be removed in stages using a series of different temperatures with optional use of vacuum. Generally speaking, it is preferred to initially remove the major amount (up to 25 percent) of the water under forced air conditions and at low temperatures (e.g. 20° C. to 30° C.). If the film has enough structural integrity at this stage, it can be hung or optionally oriented by placing under tension in the appropriate frame while the remaining water is removed, preferably at an elevated temperature, for example, from about 50° C. to about 150° C. Final conditioning of the film can be completed under controlled conditions of heat and humidity.

The films in accordance with the present invention whether deposited on a substrate or made as free standing films can be prepared in any desired thickness. Typically, the films can have a thickness of from about one mil to about 50 mils.

The excellent properties of the films include good clarity, high gloss, good weather resistance including water repellency, abrasion resistance, and the like. This makes them particularly useful in the manufacture of waterproof clothing, tarpaulin, chip-resistant coatings in automotive applications such as protective coating applied after a car has been painted, as coatings for high grade paper, and the like. The present films provide excellent protective coatings on aircraft acrylic canopies and in ballistic glazing applications.

The above utilities can be achieved without the need for using organic solvents which, for the most part, are required in the prior art coatings. Of even more significance is the fact that the present polymers can be prepared with increasing hardness and stiffness values while at the same time keeping relatively constant permanent set properties. Heretofore, this has not been possible. Accordingly, the present compositions are provided with increased hardness and tensile modulus properties without having to resort to the need of higher hard segment linkages derived from higher diisocyanate concentrations. That is to say, the increase in hardness properties is achieved in the soft segment part of the prepolymer rather than in the hard segment portion. Notably, the present polymers provide another means to alter film properties to higher hardness while still retaining good water dispersibility with no fish-eyes in the final polymers and no objectionable cross-linking.

The following examples describe the manner and process of making and using the invention and set forth the best mode contemplated by the inventors of carrying out the invention but are not be construed as limiting.

EXAMPLE 1

The following experiments describe the preparation of five aqueous dispersions of ionic polyurethane-polyureas in accordance with the present invention and the films prepared therefrom (Samples I to V) as well as a comparison 1 aqueous dispersion of an ionic polyurethane-polyurea and its film which are not in accordance with this invention.

A one liter three-necked flask which has been dried in an air oven at 110° C. for at least one hour is equipped with a stirrer, thermometer, and gas inlet tube. To the flask is added 6.8 g (0.1014 eq.) of 2,2-bis(hydroxymethyl)propionic acid, 104.7 g (0.1049 eq.) of a 2,000 molecular weight polypropyleneoxy-polyethyleneoxy capped diol, 1.3 g (0.0057 eq.) of a glycerol based polypropyleneoxy-polyethyleneoxy capped triol of molecular weight of about 684, and 41.5 g (0.3168 eq.) of 4,4'-methylenebis(cyclohexyl isocyanate). The reaction mixture is stirred under nitrogen at about 100° C. for two hours. The mixture is cooled to about 70° C. and 0.5 of octadecyl-3,5-ditertiary butyl-4-hydroxy-hydrocinnamate added to act as an antioxidant stabilizer. After about five minutes of stirring, 4.9 g (0.0485 eq.) of triethylamine is added and stirring continued for about 20 minutes at a reaction solution temperature of about 70° C. This proportion of amine is sufficient to neutralize about 96 mole percent of the carboxylic groups in forming the triethylammonium carboxylate salt of the isocyanate terminated prepolymer which has formed. The prepolymer is a uniform, viscous, and opaque resin at this temperature.

The stirring speed is increased and 350 ml of water is added causing the immediate formation of an emulsion of the prepolymer in the water. After a few minutes of the rapid stirring, 3.0 g (0.0998 eq.) of ethylenediamine dissolved in 50 ml of water is added followed by an additional 50 ml of rinse water to ensure complete transfer of diamine. The emulsion is stirred for about 60 minutes at the ambient temperature. Thus, there is obtained the milky white aqueous dispersion or emulsion of an ionic polyurethane-polyurea sample I in accordance with the present invention wherein the hydroxyl equivalent percent proportions of the diol polyether to the triol polyether are 94.8 percent and 5.2 percent respectively as set forth in Table I below. The emulsion contains 26.5 percent of ionic polyurethane-polyurea and is completely stable with no separation of solids upon storage.

A film is prepared from the dispersion I by syringing a bubble free sample of the emulsion into a mole measuring 3 inches by 3 inches by ⅛ inch. The mold is left in a fume hood for 24 hours whereupon a clear flexible film is removed from the mold and hung in the hood for further drying. After 24 hours, it is placed in an air oven for 12 hours at 75° C. and, then conditioned by storage in an area of constant temperature (20° C.) and constant humidity (50 percent) for at least 24 hours. Thus there is obtained a film I in accordance with the present invention having a thickness of ~40 mils. The tensile properties and hardness of the film are set forth in Table I.

Samples II through V, both aqueous dispersions and films, are prepared identically to I above with the only exceptions being the changes in the proportions of the polyether diols and triols described above to satisfy the hydroxyl equivalent percentages set forth in Table I. The tensile properties and hardness values of the films are set forth below.

The comparisons emulsion and film are prepared identically to the samples described above except that no triol is employed and the 6.8 g of 2,2-bis(hydroxymethyl)propionic acid is reacted with 100 g (0.1002 eq.) of the above described polyether diol and 40 g (0.3053 eq.) of 4,4'-methylenebis(cyclohexyl isocyanate) to form the prepolymer. Subsequent treatment is the same as previously described to form the emulsion of the final polymer and film. The physical properties of this film are set forth in Table I below.

Notwithstanding the increasing hardness and modulus values of the samples I through V as compared with comparison 1, the permanent set values remain virtually constant within the series. Notably, all of the emulsions of the invention retain complete water dispersibility. No fish-eyes can be observed in the film samples and there is no evidence of objectionable cross-linking in these films.

TABLE I

| Sample | I | II | III | IV | V | Comparison 1 |
|---|---|---|---|---|---|---|
| Diol/Triol (equiv. %) | 94.8/5.2 | 90/10 | 80.2/19.8 | 69.9/30.1 | 50/50 | 100/0 |
| Physical Properties of Films: | | | | | | |
| Tensile Str. (psi) | 2425 | 2712 | 2425 | 2500 | 2600 | 3067 |
| Elongation (%) | 826 | 776 | 607 | 449 | 221 | 898 |
| Tensile Modulus at 300% Elong. (psi) | 280 | 323 | 398 | 536 | — | 304 |
| Tangent Modulus (psi) | 697 | 1116 | 1617 | 3430 | 3667 | 767 |
| [1]Permanent Set (%) | 25 | 22 | 25 | 24 | 28 | 25 |
| Shore A Hardness | 62 | 68 | 68 | 68 | 82 | 58 |

Footnote
[1]Permanent Set: Measures the permanent stretch as percent of permanent increase in a measured length of a sample after it has been stretched until broken in accordance with ASTM D1708-79; the lower the percentage value the less the permanent set in the stretched sample.

What is claimed is:

1. A stable aqueous dispersion of an ionic polyurethane-polyurea prepared by the reaction of:
   A. an aqueous dispersion of an isocyanate terminated ionic prepolymer prepared in the absence of solvent from:
      (i) an aliphatic or cycloaliphatic diisocyanate;
      (ii) a polyol mixture comprising:
         (a) from about 50 to about 95 equivalent percent of a polyalkyleneoxy diol having a molecular weight of from about 500 to about 6,000; and
         (b) from about 50 to about 5 equivalent percent of a polyalkyleneoxy triol having a molecular weight of from about 500 to about 3,000; and
      (iii) a carboxylic acid containing diol wherein said acid is neutralized with a tertiary amine after said prepolymer formation to form said ionic function prior to forming said aqueous dispersion,
   wherein said (iii) is present in sufficient proportions to provide about 10 to about 150 milliequivalents of said ionic groups per 100 grams of said prepolymer and further, wherein the proportions of said (i), (ii), and (iii) are such that the ratio of isocyanate equivalents to the total isocyanate-reactive equivalents falls in a range of from about 1.1 to about 3; and
   B. an alkylene diamine wherein the proportions of said (A) and (B) are such that the ratio of equivalents of isocyanate in (A) to amine equivalents in (B) falls in a range of from about 1.25 to about 0.90.

2. A dispersion according to claim 1 wherein said extender comprises an alkylene diamine.

3. A dispersion according to claim 1 wherein said diisocyanate (i) comprises a cycloaliphatic diisocyanate.

4. A dispersion according to claim 1 wherein said diisocyanate (i) comprises 4,4'-methylenebis(cyclohexyl isocyanate).

5. A dispersion according to claim 1 wherein said triol comprises a polyethyleneoxy capped polypropyleneoxy triol.

6. A dispersion according to claim 1 wherein said carboxylic acid is neutralized with a tertiary amine after said prepolymer formation and prior to forming said aqueous dispersion.

7. A film prepared from an aqueous dispersion in accordance with claim 1.

8. A substrate coated with a film prepared from an aqueous dispersion in accordance with claim 1.

9. A stable aqueous dispersion according to claim 1 prepared by the reaction of:
   A. an aqueous dispersion of an isocyanate terminated prepolymer prepared in the absence of solvent from:
     (i) 4,4′-methylenebis(cyclohexyl isocyanate);
     (ii) a polyol mixture comprising:
       (a) a polyethyleneoxy-capped polypropyleneoxy diol having a molecular weight of about 1,000 to 3,000; and
       (b) a polyethyleneoxy-capped polypropyleneoxy triol having a molecular weight of about 500 to 2,000; and
     (iii) 2,2-bis(hydroxymethyl)propionic acid wherein said acid is neutralized with a tertiary amine after said prepolymer formation to form said ionic function prior to forming said aqueous dispersion, wherein said (iii) is present in sufficient proportions to provide about 20 to about 125 milliequivalents of said ionic groups per 100 grams of said prepolymer, and wherein the proportions of said (i), (ii), and (iii) provide for a ratio of isocyanate equivalents to the total isocyanate-reactive equivalents of about 1.2 to 2; and B. a $C_2$ to $C_8$ alkylene diamine in sufficient proportions to provide a ratio of isocyanate equivalents from (A) to amine equivalents from (B) of about 1.10 to 0.95.

10. A dispersion according to claim 9 wherein said (iii) is neutralized with triethylamine.

11. A dispersion according to claim 10 wherein said (B) comprises ethylenediamine.

12. A dispersion according to claim 11 wherein said polyol mixture (ii) comprises a diol and triol mixture of molecular weights of about 2,000 and 700, respectively.

* * * * *